No. 782,106. PATENTED FEB. 7, 1905.
C. H. BURTON.
PNEUMATIC CARRIER.
APPLICATION FILED FEB. 15, 1904.
2 SHEETS—SHEET 1.
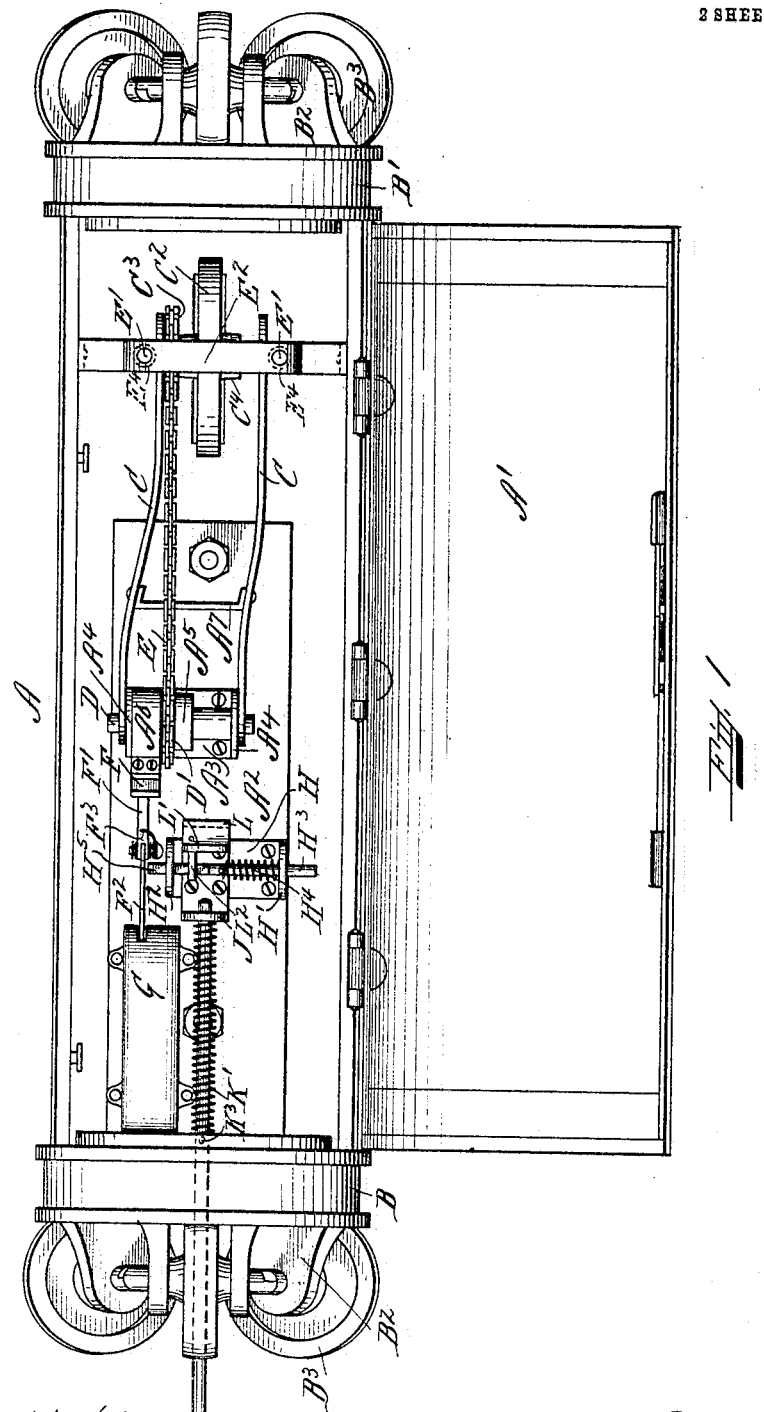

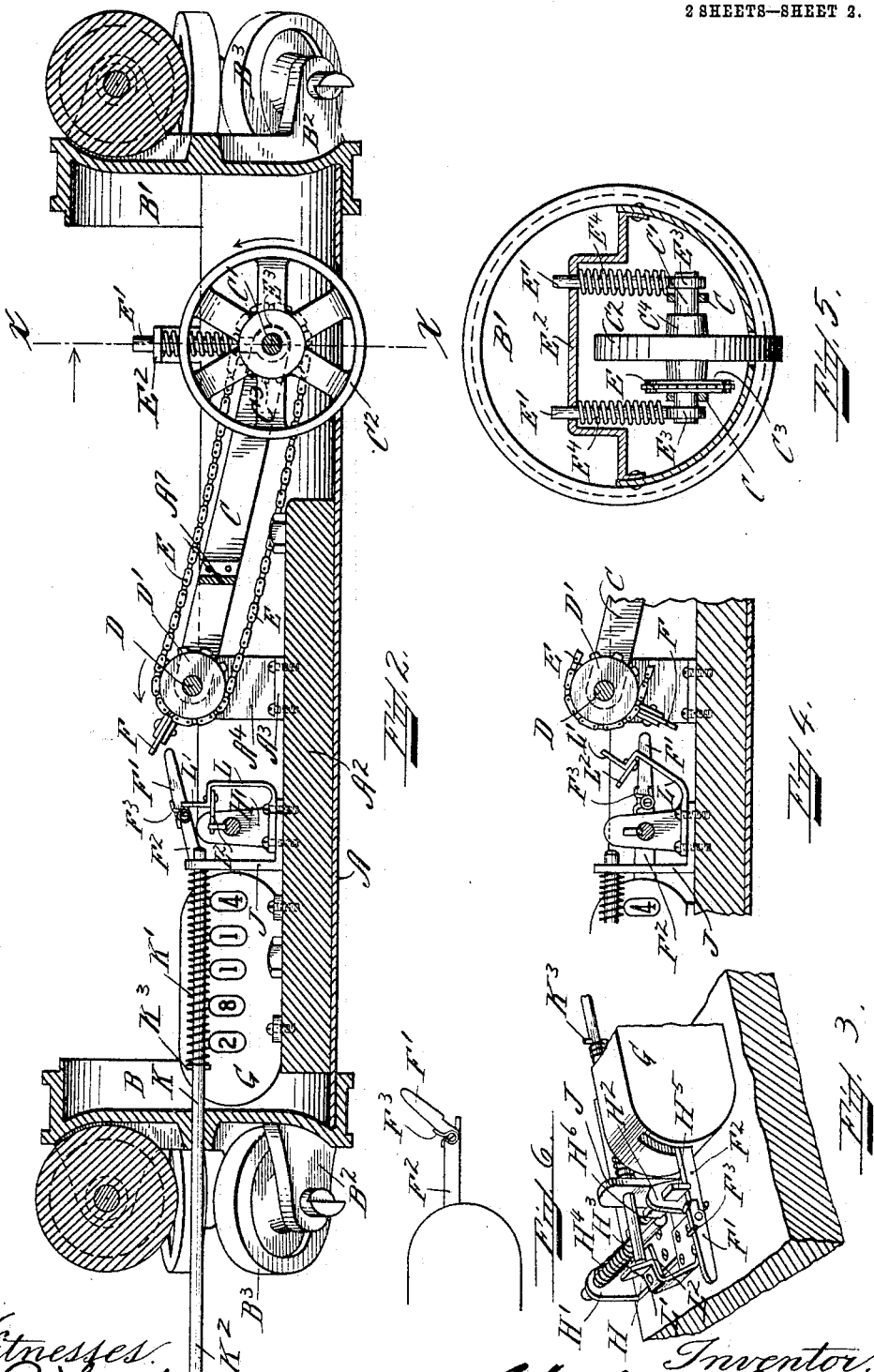

No. 782,106. Patented February 7, 1905.

UNITED STATES PATENT OFFICE.

CHARLES H. BURTON, OF BOSTON, MASSACHUSETTS, ASSIGNOR TO AMERICAN PNEUMATIC SERVICE COMPANY, OF DOVER, DELAWARE, A CORPORATION OF DELAWARE.

PNEUMATIC CARRIER.

SPECIFICATION forming part of Letters Patent No. 782,106, dated February 7, 1905.

Application filed February 15, 1904. Serial No. 193,522.

*To all whom it may concern:*

Be it known that I, CHARLES H. BURTON, of Boston, in the county of Suffolk and State of Massachusetts, have invented certain new and useful Improvements in Pneumatic Carriers, of which the following is a specification.

My invention relates to new and useful improvements in carriers for pneumatic-despatch-tube systems; and its object is to provide mechanism on the carrier for indicating the location of obstructions in the transmission-tube—such, for instance, as a carrier stuck in the tube.

My invention consists of certain novel features hereinafter described, and particularly pointed out in the claims.

In the accompanying drawings, which illustrate a construction embodying my invention, Figure 1 is a top plan view of the carrier with the cover open, showing the interior mechanism. Fig. 2 is a longitudinal sectional view through the carrier with the cover omitted. Fig. 3 is a perspective view of the registering mechanism. Fig. 4 is a side view of part of the registering mechanism and part of the mechanism which operates the same. Fig. 5 is a vertical cross-sectional view through the carrier on the line X X, Fig 2. Fig. 6 is a detail side view of the lever which operates the registering mechanism and a part of the register.

Like letters of reference refer to like parts throughout the several views.

The carrier consists of a shell A provided with a suitable cover A' hinged thereto. On the front and rear heads B B' are located the wheels $B^3$, supported on suitable bearings $B^2$ in a manner well known in the art and adapted to revolve in the movement of the carrier. Secured to the shell A is a suitable base $A^2$, and secured to said base is a bracket $A^3$, having vertical extensions $A^4$, which form bearings for the shaft D. Loose on said shaft D is a hub $A^5$, on which is fixed fast the sprocket-wheel D'. This hub $A^5$ is enlarged beyond the sprocket-wheel, as shown at $A^6$, and carries rigidly fixed thereto the finger F, hereinafter described. Pivoted on the opposite ends of the shaft D and extending rearwardly are two metallic arms C, joined together by a suitable brace $A^7$ and at their rear ends yieldingly support the shaft C', on which is mounted freely the hub $C^4$, carrying the wheel $C^2$ and the sprocket-wheel $C^3$. The arms C are mounted freely on the shaft D to allow the wheel $C^2$ to pass over slight obstructions, and by means of the springs $E^4$, bearing on the hubs $E^3$ of the rods E', the wheel $C^2$ is kept in contact with the bottom of the tube at all times, except when yielding in passing over slight obstructions. In passing around curves the centrifugal motion would naturally keep the wheels away from contact with the sides of the tube were it not for the springs $E^4$, which cause the wheel $C^2$ to bear against the sides of the tube and properly register the distance, as hereinafter described. The registering-wheel $C^2$ moves up and down in a suitable bracket $E^2$, secured to the shell of the carrier. Around the sprocket-wheels D' and $C^3$ is arranged the sprocket-chain E.

Located in the front of the carrier is a suitable registering device G, adapted to be operated by the lever $F^2$, provided with the finger F', yieldingly connected by the spring $F^3$ and adapted to be operated, as hereinafter described, by the finger F. Located to one side of the register G is a rod K, having its forward end $K^2$ held outwardly in front of the carrier (shown in Fig. 2) by the spring K', bearing against the bracket J and pin $K^3$ on said rod K. Located in alinement with the inner end of said rod K is a finger L' and strip L, of soft steel, fastened at its lower end to the base $A^2$, and extending laterally from said strip L is the finger $L^2$, adapted in the normal position of the parts, (as when the carrier is inserted in the tube,) to engage with the recess H⁶ of the strip H⁵, secured to the rod H³, and hold said rod with the strip H⁵ inwardly and out of the path of the lever F², as shown in Fig. 1. This rod H³ and strip H⁵ are suitably supported in the vertical extensions H′ H² of the bracket H.

If the line becomes blocked by a carrier containing mail-matter, packages, or the like, the operator inserts the detecting-carrier, previously described, with the mechanism in the position shown in Figs. 1 and 2, and it is driven along the tube by pressure, and during its travel the wheel C² rotates and transmits its motion through the sprocket-wheels C³ and D′ and the sprocket-chain E to the finger F on the part A⁶ of the hub A⁵, which finger F rotating strikes the finger F′ of the lever F² and moves the same downwardly each time that it strikes said lever, which after the finger F has passed moves up into its upper position, which is common in registering devices. The continued travel of the carrier is registered on the register G through the wheel C² and its coöperating parts. When the end K² of the rod K strikes the carrier which is stuck in the line, the rod K is moved inwardly against the tension of the spring K′ and strikes the finger L′, raising the finger L² up and out of engagement with the recess H⁶ in the strip H⁵, (indicated in Fig. 3,) thereby allowing the spring H⁴ to move the strip H⁵ out through its support H² and over the lever F² and locking the register against further registration. If the detecting-carrier, together with the one which blocks the line, is not discharged in the usual period of time, the current is reversed, and the pressure coming from the opposite end and escaping past the blocking-carrier moves the detecting-carrier out at the end of the line from which it was sent. The attendant having made a memorandum of the registration on the detecting-carrier made by a previous operation subtracts the same from the registration just made, and in this manner estimates how far in the line the blocking-carrier is located, the wheel C² of course traveling a predetermined distance in each complete revolution. For instance, if the wheel represents a distance of eighteen inches in each complete revolution the attendant would multiply eighteen inches by the difference between the two revolutions previously made. For example, if when the detecting carrier was sent out the register indicated "28,114," as shown in Fig. 2, and upon its return it indicated "28,184," this would mean that the wheel C² had made seventy complete revolutions, and each revolution representing one and one-half feet, or eighteen inches, the distance of the blocking-carrier would be one hundred and five feet from the terminal from which the detecting-carrier started. A lineman would then be sent out to dig up the street at a point approximately one hundred and five feet from the sending-terminal, open up the line, and remove the blocking-carrier. As the detecting-carrier returns the wheel C² turns in the opposite direction, bringing the finger F in contact with the under side of the finger F′, which yields upwardly as it is pivoted to the lever F² and normally held in alinement with the lever F² by the spring F³, which, however, yields as the finger F strikes the under side of the finger F′, thereby allowing the finger F′ to pass without affecting the registering mechanism. After the detecting-carrier has been returned the mechanism is put into its normal condition, as shown in Fig. 1, by returning the finger F² into the recess H⁶, as the strip is made of soft steel and is capable of being reset.

I do not limit myself to the arrangement and construction shown, as the same may be varied without departing from the spirit of my invention.

Having thus described the nature of my invention and set forth a construction embodying the same, what I claim as new, and desire to secure by Letters Patent of the United States, is—

1. In a detecting-carrier for pneumatic-despatch-tube systems, a register for recording the travel of the carrier, mechanism for actuating said register operated by the travel of the carrier, and mechanism operated by the obstruction in the line for locking said register against movement.

2. In a detecting-carrier for pneumatic-despatch-tube systems, a register, a lever for operating said register, a shaft, a hub mounted on said shaft, a finger on said hub for operating said lever, a sprocket-wheel on said hub, a rotatable wheel yieldingly supported and provided with a sprocket-wheel, a sprocket-chain around said sprocket-wheels for communicating motion of said rotatable wheel to said sprocket-wheels to cause said finger to operate said lever, a lock for holding said lever against movement, and normally out of engagement with the said lever, means for holding said lock normally out of engagement with said lever, and means operated by contact with the obstruction in the line for releasing said locking means.

3. In a detecting-carrier for pneumatic-despatch-tube systems, a register, a lever for operating said register, a shaft, a hub mounted on said shaft, a finger on said hub for operating said lever, a sprocket-wheel on said hub, a rotatable wheel yieldingly supported and provided with a sprocket-wheel, a sprocket-chain around said sprocket-wheels for communicating motion of said rotatable wheel to said sprocket-wheels to cause said finger to operate said lever, a spring-controlled lock for holding said lever against movement and normally out of engagement with said lever, means for holding said lock normally out of engagement with said lever, and a spring-controlled rod operated by contact with the obstruction in the line for releasing said locking means.

In testimony whereof I have signed my name to this specification, in the presence of two subscribing witnesses, this 29th day of January, A. D. 1904.

CHARLES H. BURTON.

Witnesses:
    WILLIS C. MERRILL,
    A. L. NUSSER.